Patented Dec. 16, 1941

2,266,260

UNITED STATES PATENT OFFICE 2,266,260

TITANIUM OXIDE PIGMENT PRODUCTION

James Howard Peterson, Wilmington, Del., assignor to E. I. du Pont de Nemours & Company, Wilmington, Del., a corporation of Delaware No Drawing. Application October 12, 1939,
Serial No. 299,106

11 Claims. (Cl. 106—300)

This invention relates to improvements in processes for producing titanium oxide pigments, and more particularly to a process for obtaining an improved titanium oxide characterized by substantially the rutile crystalline pattern. More specifically, it relates to a process for producing titanium oxide pigments desirably improved in chalking resistance characteristics and superior in brightness and tinting strength.

Titanium oxide pigments, and especially the rutile as distinguished from the anatase modification thereof, when used in coating compositions to be exteriorly applied, exhibit an objectionable and pronounced tendency towards chalking. As a result of this latter characteristic and the ensuing film erosion which takes place on weathering and exposure of the coating composition to the elements, the life of such coating film becomes considerably shortened and to an objectionable extent. As a result, the protection sought to be afforded the surface or article coated is not attained. Also, and in addition to their marked tendency towards chalking and lack of weather resistance, such pigments, when employed in coating compositions adapted for interior use, tend to cause a progressive yellowing or discoloration of the paint film.

I have discovered that the disadvantages exhibited by prior titanium oxide pigments, and especially those possessing the X-ray diffraction pattern of rutile, can be easily and effectively overcome. It is among the objects of this invention, therefore, to provide a novel process for attaining such results. It is among the particular objects of the invention to advantageously improve the properties and characteristics of rutile pigments, and especially those prepared from the hydrolysis of titanium chloride solutions. Further particular objects include the provision of a rutile titanium oxide pigment which is inherently high in chalk resistance characteristics and possesses improved tinting strength and brightness. A special object of the invention is to provide a novel method for stabilizing rutile titanium oxide pigments whereby their calcination can be readily effected over a relatively wide range of temperature and without any substantial loss in ultimate pigment strength or brightness.

These and other objects are attainable in this invention which broadly comprises calcining raw pigment titanium oxide in the presence of a relatively small amount of an alkaline earth metal chloride having a melting point above 750° C.

In a more specific embodiment, the invention comprises calcining precipitated, hydrolyzed, raw rutile titanium oxide in the presence of from about .5% to 10%, on the $TiO_2$ basis, of a relatively high melting alkaline earth metal chloride, or mixtures thereof, e. g., one having a melting points above 750° C. and preferably between substantially 750° C. and 1000° C.

In adapting the invention to practice, a relatively small amount, preferably from about .5% to about 2.5%, on the $TiO_2$ basis, of an alkaline earth metal chloride having a melting point above 750° C., such as, preferably, barium chloride, is suitably and intimately mixed or associated with a raw pigment titanium oxide precipitate, prior to calcination of the latter. Combination of the $TiO_2$ with the chloride treating agent may be effected either by directly adding a solution of such treating agent to a hydrolyzable titanium salt solution (preferably titanium chloride), or to a rutile hydrolysate or precipitate which is obtained from the hydrolysis of such solution. Examples of useful types of titanium chloride solutions and/or raw rutile precipitates which are adapted for use in the invention, together with suitable methods for preparing the same, include those mentioned and contemplated in the previously issued U. S. Patent No. 2,062,133, dated November 24, 1936.

As stated, the alkaline earth metal chloride treating agent may be added, while in solution, directly to the titanium salt solution, or to the precipitate itself; or, if desired, such agent may be formed in situ, as by reacting hydrochloric acid with alkaline earth metal hydroxides or carbonates in the presence of the titanium solution or $TiO_2$ precipitate. Those alkaline earth metal chlorides which have a melting point above substantially 750° C., such as, for example, barium, strontium and calcium chlorides, and particularly barium chloride, are especially adaptable for use in the invention and therefore comprise preferred types of agents. Alkaline earth metal chlorides having a melting point below 750° C., for example, magnesium chloride, are not suitable for use in the invention. When such relatively low melting chlorides are present during calcination, the molten salts act as a flux for particle growth and products of objectionably large particle size are obtained.

After effecting suitable incorporation of the chloride agent in the raw $TiO_2$, the resulting composition is subjected to calcination in a suitable type of furnace, such as a rotary calciner, and at temperatures ranging from substantially 750° C. to 1,100° C., but preferably within a range of about 850° C. to about 1,000° C. The resulting calcined product is thereafter ground to desired fineness in a conventional type of grinding mill and a product recovered which exhibits improved pigmentary characteristics, especially improved chalking resistance, tinting strength and brightness. When such pigment is incorporated in conventional types of coating formulations, such as paints and enamels, and panels are made up therefrom for exposure and weathering tests, it will be found that exceptional durability characteristics are imparted to the resulting films.

To a more clear understanding of the invention, the following illustrative examples are given, none of which, however, are to be considered as limiting in effect:

Example I

A hydrochloric acid titanium solution was prepared containing the equivalent of 300 g. $TiO_2$ per liter and in which the ratio of tetravalent Ti to Cl was about 1:3. The solution contained no substantial amounts of iron or other metal salts.

An hydrolysis seed was prepared from this solution by diluting to about 30 grams $TiO_2$ per liter and subsequently mixing with sodium hydroxide solution to the point where its acidity was reduced to a pH value of about 2.5. This suspension was then heated for 30 minutes at 80° C. and quickly cooled to 50° C.

A hydrochloric acid titanium solution of the above composition was made up for hydrolysis by diluting the same to a concentration of 110 g. $TiO_2$ per liter. This solution was seeded with 3% on the $TiO_2$ basis of the above seed. 5 g. of barium chloride per liter were added to the solution. The solution was heated to 95° C. and held at that temperature for 30 minutes, after which the precipitate was cooled and about 80% of the mother liquor removed therefrom by filtration. The filter cake containing about 20% of the added $BaCl_2$ was dried and calcined in a tube furnace held at 950° C. for 30 minutes. The calcined pigment was wet ground for 6 hours in a pebble mill. Portions of the filter cake were calcined also at 850, 900 and 1,000° C.

The calcined products were characterized by high tinting strength and brightness. Furthermore, the tinting strength and brightness were remarkably constant over the range of calcination temperature from 850 to 1,000° C., as is shown by the data below:

| Pigment | Calc. temp. | Tinting strength | Brightness |
| --- | --- | --- | --- |
| 1 | 850 | 188 | 19 |
| 2 | 900 | 189 | 19 |
| 3 | 950 | 185 | 20 |
| 4 | 1,000 | 181 | 20+ |

Durability and resistance to chalking and fading of the resultant product were also determined. The formulation used in preparing the paint for exposure tests was as follows: 20% rutile/50% leaded zinc oxide/30% extender (asbestine and silica) in a linseed oil vehicle. The panel was exposed outside for 42 months and observations were made periodically of the failures taking place in the film. The rutile pigment showed an excellent improvement over the fade resistance of commercial anatase pigment which was similarly exposed as a control.

Another rutile pigment was prepared in a manner similar to the above procedure except that no barium chloride was added to the titanium chloride solution before hydrolysis. This pigment was incorporated in the same type of coating formulation and similarly exposed for comparison. As a result, it was determined that such product was much inferior to the pigment treated in accordance with my invention and failed to measure up to the chalking and fade resistance which commercial anatase employed as a control exhibited.

Example II

Raw rutile pigment was prepared by hydrolysis of a titanium chloride solution at a concentration of 110 g. $TiO_2$ per liter. This solution was seeded with 3% on the $TiO_2$ basis of the same type of seed material as described in the preceding example. The seeded solution was heated to 95° C. and held at 95–98° C. for 30 minutes. The raw pigment precipitate was filtered to remove a major portion of the hydrolysis liquor. To one portion of the filter cake was added barium chloride equivalent to 1% $BaCl_2$ on the $TiO_2$ basis. No salt was added to the other portion. The two products were similarly calcined and tested for tinting strength and brightness. The sample which contained barium chloride was definitely superior to the controlled product as regards both of these properties, as shown by the following tests:

| | Pigment | Calc. temp. | Tinting strength | Brightness |
| --- | --- | --- | --- | --- |
| 1 | Control—no salt added | 950 | 197 | 14+ |
| 2 | 1% $BaCl_2$ | 900 | 207 | 16+ |
| 3 | 1% $BaCl_2$ | 950 | 208 | 16 |

Example III

A titanium chloride solution was hydrolyzed as in Example II, using the same kind of seed material. The hydrolysis slurry was allowed to stand and a portion of the rutile liquor was drawn off by decantation and coagulated. The coagulated raw pigment, after filtering and washing, was mixed with barium chloride equal to 0.75% $BaCl_2.2H_2O$ on the $TiO_2$ basis. The raw pigment was dried and calcined at 950° for 30 minutes. The product was characterized by excellent tinting strength and color, tinting strength—188; color—23 compared with tinting strength of 180 and color of 19–20 for similar rutile pigments without $BaCl_2$ present during calcination.

Example IV

Titanium chloride solution containing 110 g. $TiO_2$ and 10 g. $BaCl_2$ per liter was hydrolyzed as in Example 2. A similar solution containing no $BaCl_2$ was hydrolyzed for a control. The two raw pigments were filtered to remove as much mother liquor as possible without washing. Possibly about one-fifth of the $BaCl_2$ remained in the pigment. The raw pigments were dried and calcined at 950°. The one containing $BaCl_2$ was superior in tinting strength and color to the control.

| | Tinting strength | Brightness |
| --- | --- | --- |
| With $BaCl_2$ | 198 | 18 |
| Without $BaCl_2$ | 183 | 14 |

Example V

Rutile raw pigment was prepared in accordance with the procedure of Example II by hydrolysis of titanium tetrachloride solution. $CaCl_2$ equal to 1% on the $TiO_2$ basis was added to the wet raw pigment and the product dried at 100° C. and calcined at 800, 825 and 850° C. The finished pigment exhibited substantially the same durability and chalk resistance improvements as shown above and also exhibited improved color properties over the untreated control, as shown by the following data:

| Calcination temperature | No salt added | | 1% $CaCl_2$ added to raw pigment | |
|---|---|---|---|---|
| | Strength | Color | Strength | Color |
| 800 | 197 | 12 | 197 | 15 |
| 825 | | | 196 | 15 |
| 850 | 208 | Poor | 197 | 16+ |
| 900 | 205 | 12 | | |

The values given for tinting strength were determined in accordance with the methods described by J. E. Booge and H. E. Eastlack in the Paint, Oil and Chemical Review of April 16, 1924; while those for color and brightness were determined in accordance with a procedure essentially that described by the same authors in the Paint, Oil and Chemical Review dated April 9, 1924. Commercial $TiO_2$ pigments, tested by such methods, exhibit a strength value of 150 and brightness or color values of 16.

As will be evident, the invention advantageously affords the production of rutile titanium oxide pigments of superior chalking resistance, tinting strength and brightness; and permits one to conduct the calcination over a relatively wide range of temperature without encountering the danger of pigment degradation, and especially color when calcination temperatures of an excessively high order are resorted to. Furthermore, use of the instant pigment in coating compositions adapted to exterior exposures will impart exceptional durability characteristics to the resulting films and permit of the ready use of rutile titanium oxide pigments in films to be used exteriorly. The stability and resistance towards weathering which rutile titanium oxide pigments treated with my alkaline earth metal chloride treating agent afford is evident from the foregoing comparative exposure tests, demonstrating that samples prepared without my treating agent present therein were distinctly inferior to the anatase control, whereas the panel coated with a film containing my treated pigment was desirably superior in fade resistance to both the anatase and untreated $TiO_2$ samples.

While, as indicated, optimum results accrue in my invention when, preferably, precipitated raw rutile titanium oxide is subjected to treatment, beneficial results also obtain, though to a somewhat lesser extent, when rutile titanium oxide previously subjected to calcination is likewise treated. Accordingly, the invention is to be considered as adaptable to treating either pigment developed rutile titanium oxide or precipitated raw rutile pigment.

I claim as my invention:

1. A process for producing an improved rutile titanium oxide pigment comprising calcining hydrolyzed precipitated titanium oxide in the presence of a small amount of an alkaline earth metal chloride having a melting point above substantially 750° C.

2. A process for producing a stable, weather-resistant rutile titanium oxide pigment comprising calcining precipitated rutile titanium oxide in the presence of a small amount of an alkaline earth metal chloride having a melting point above 750° C. and up to about 1000° C.

3. A process for producing a stable, weather-resistant rutile titanium oxide pigment comprising calcining precipitated rutile titanium oxide in the presence of from about .5% to 10% of an alkaline earth metal chloride melting above 750° C.

4. A process for producing a stable, chalk-resistant rutile titanium oxide pigment comprising calcining a raw rutile titanium oxide pigment in the presence of a small amount of barium chloride.

5. A process for producing a stable, chalk-resistant rutile titanium oxide pigment comprising calcining a raw rutile titanium oxide pigment in the presence of a small amount of strontium chloride.

6. A process for producing a stable, chalk-resistant rutile titanium oxide pigment comprising calcining a raw rutile titanium oxide pigment in the presence of a small amount of calcium chloride.

7. A process for producing a stable, chalk-resistant rutile titanium oxide pigment comprising calcining a raw rutile titanium oxide pigment in the presence of from .5% to 2.5% of barium chloride.

8. A process for producing a chalk-resistant rutile titanium oxide pigment of improved tinting strength and brightness comprising subjecting titanium oxide precipitated from the hydrolysis of a titanium chloride solution to calcination in the presence of from about .5% to 10% of an alkaline earth metal chloride having a melting point above 750° C.

9. A process for producing a chalk-resistant rutile titanium oxide pigment of improved tinting strength and brightness comprising adding a small amount of an alkaline earth metal chloride melting above 750° C. to a titanium chloride solution, subjecting said solution to hydrolysis, and calcining the resulting rutile titanium oxide precipitate at temperatures ranging from substantially 750° C. to 1,100° C.

10. A process for producing a chalk-resistant rutile titanium oxide pigment having improved tinting strength and brightness, comprising adding a small amount of an alkaline earth metal chloride melting above 750° C. to a titanium chloride solution, subjecting the resultant mixture to hydrolysis, and calcining the rutile titanium oxide precipitate recovered at temperatures ranging from substantially 850° C. to 1,000° C.

11. A process for producing chalk-resistant titanium oxide comprising calcining titanium oxide in substantially the rutile crystalline form in the presence of from .5 to 2.5%, on the $TiO_2$ basis, of an alkaline earth metal chloride melting above substantially 750° C.

JAMES HOWARD PETERSON.